May 19, 1942.    R. A. COFFMAN    2,283,185
DIESEL ENGINE STARTER
Filed July 15, 1935    4 Sheets-Sheet 3
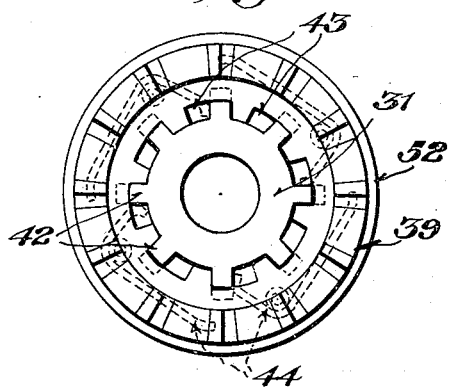
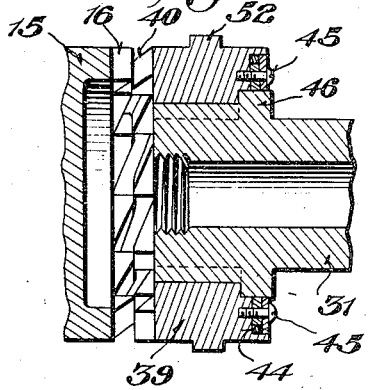
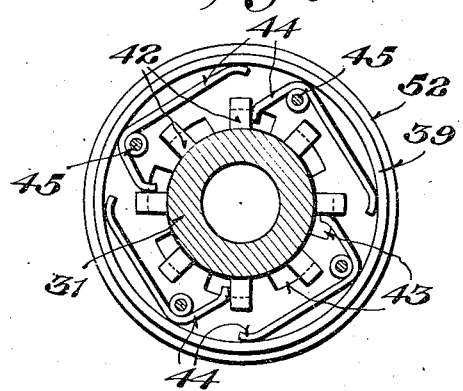
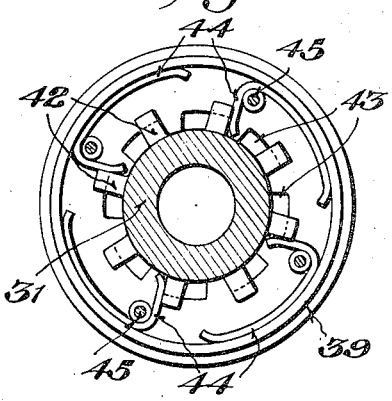
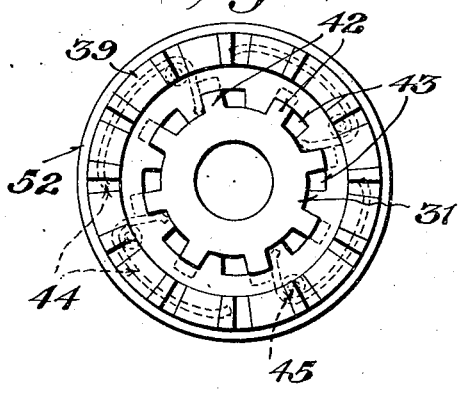
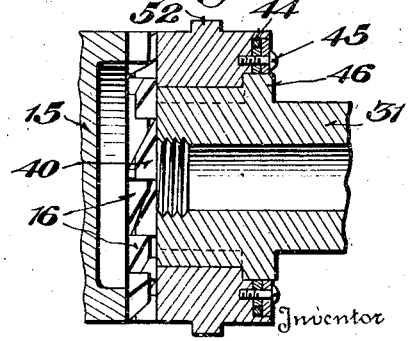
Roscoe A. Coffman,
Inventor

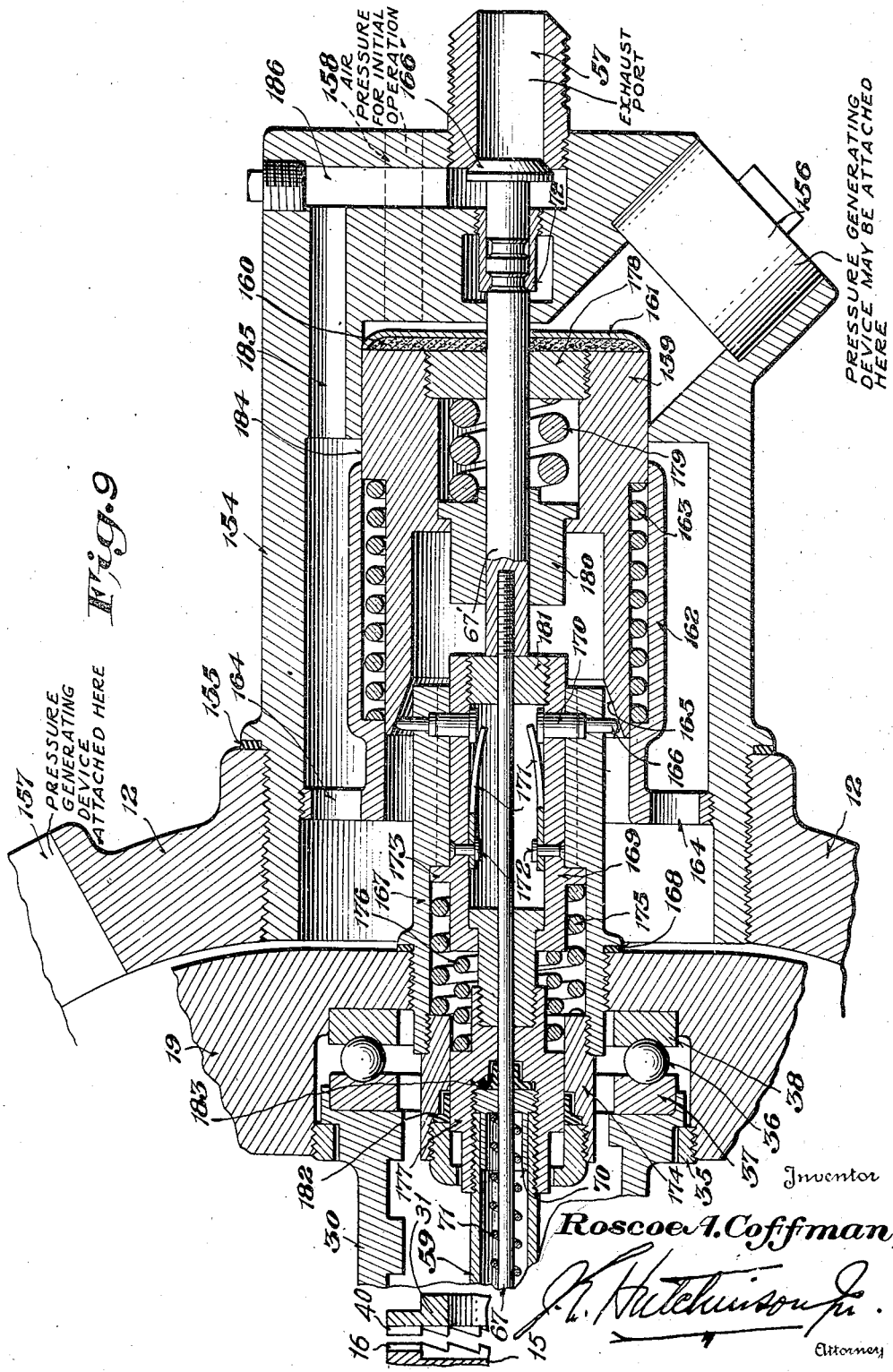

Patented May 19, 1942

2,283,185

UNITED STATES PATENT OFFICE 2,283,185

DIESEL ENGINE STARTER

Roscoe Alexander Coffman, Pittsburgh, Pa.

Application July 15, 1935, Serial No. 31,519

20 Claims. (Cl. 121—37)

This invention relates to mechanism for generating rotary power and means for operating the same, and is of the same general type as disclosed in my Patent No. 2,005,913, dated June 25, 1935, covering a power generating system for use in the starting of internal combustion engines, and wherein fuel cartridges or units are used for the purpose of generating propulsive gases for delivery to the starting motor to bring about the power or working stroke of said starting motor. The principal object of the invention is to provide means whereby the rectilinear movement of a piston is converted into a rotary movement by the interlocking relation of compound splined mechanisms to effect the rotary movement of heavy bodies and particularly adapted for the starting of Diesel engines.

In the starting operation of Diesel engines great difficulty has been found in securing a proper preliminary movement of the pistons to effect the starting of the engine due to the fact that a starting motor of tremendous force is required. Furthermore the compression within the cylinders of a Diesel engine is normally so high when the valves of the engine are closed as to preclude rapid turning of the motor to effect starting. It is therefore an object of this invention to provide a starting motor for Diesel engines which will be of sufficient strength to turn the engine at a relatively high rate of speed to effect the starting thereof, and which, at the same time, constitutes mechanism which is small and compact and which may be operated effectively with a relatively small motive force.

It is a purpose of this invention to provide a starting motor having, for example, a total pressure capacity of 563 cubic inches, capable of developing 229,770 convertible head pounds and capable of producing approximately 260 horse power at the most convenient working speed.

In the starting of engines of the Diesel type it has been found advantageous to hold the engine valves open during the accelerating movement of the body mass, and to close such valves when the inertia of the mass has been overcome. To this end this invention provides means operable through the movement of the starting motor mechanism upon the substantial completion of the working stroke for instantaneously closing the engine valves at the proper moment.

Another object of the invention is to provide means within practical mechanical limits for effecting the greatest turning movement of the driven member with a minimum movement of the driving member, and at the same time secure a minimum of friction between moving parts. To this end the moving parts of the starting motor are mounted in ball bearing relation and the pitch angle of splines connecting driving and driven parts is determined to give the greatest operating ease consistent with the employment of a plurality of inner and outer splined tubular members.

A further object of this invention is the provision of clutch engaging elements adapted to effect a positive and complete engagement of clutch jaw teeth of the starting motor with the cooperating teeth of the part to be moved, together with automatic means for resetting the motor clutch member for its next operation.

A still further object of the invention is to provide means to utilize initial operating pressure to actuate the clutch engaging means independent of and prior to the power delivery movement of the motor shaft driving member to the part to be moved.

These and other objects and advantages of this invention will become apparent in the following description, in which the appearance of like reference numerals indicate like parts, and in which:

Fig. 3 is an elevational end view of the clutching mechanism carried by the starting motor shaft with parts in pre-engaging position, and in this view the locking disc 47 is removed;

Fig. 4 is a longitudinal sectional view through the starting motor clutch teeth shown in imperfect clutching relation to clutch teeth on an engine shaft, said section taken on the line 4—4 of Fig. 1, with the locking disc 47 removed;

Fig. 5 is a view taken from the rear of Fig. 3 and also showing the parts in pre-engaging position, said section taken on the line 5—5 of Fig. 1;

Fig. 6 is a longitudinal sectional view through the starting motor clutch teeth shown in full clutching relation to clutch teeth on an engine shaft, said view being similar to Fig. 4 except for the full clutching relation referred to;

Fig. 7 is an elevational end view of the clutching mechanism carried by the starting motor shaft with parts shown in power transmitting position, this view being similar to Fig. 3 in that the locking disc 47 is removed;

Figure 1:
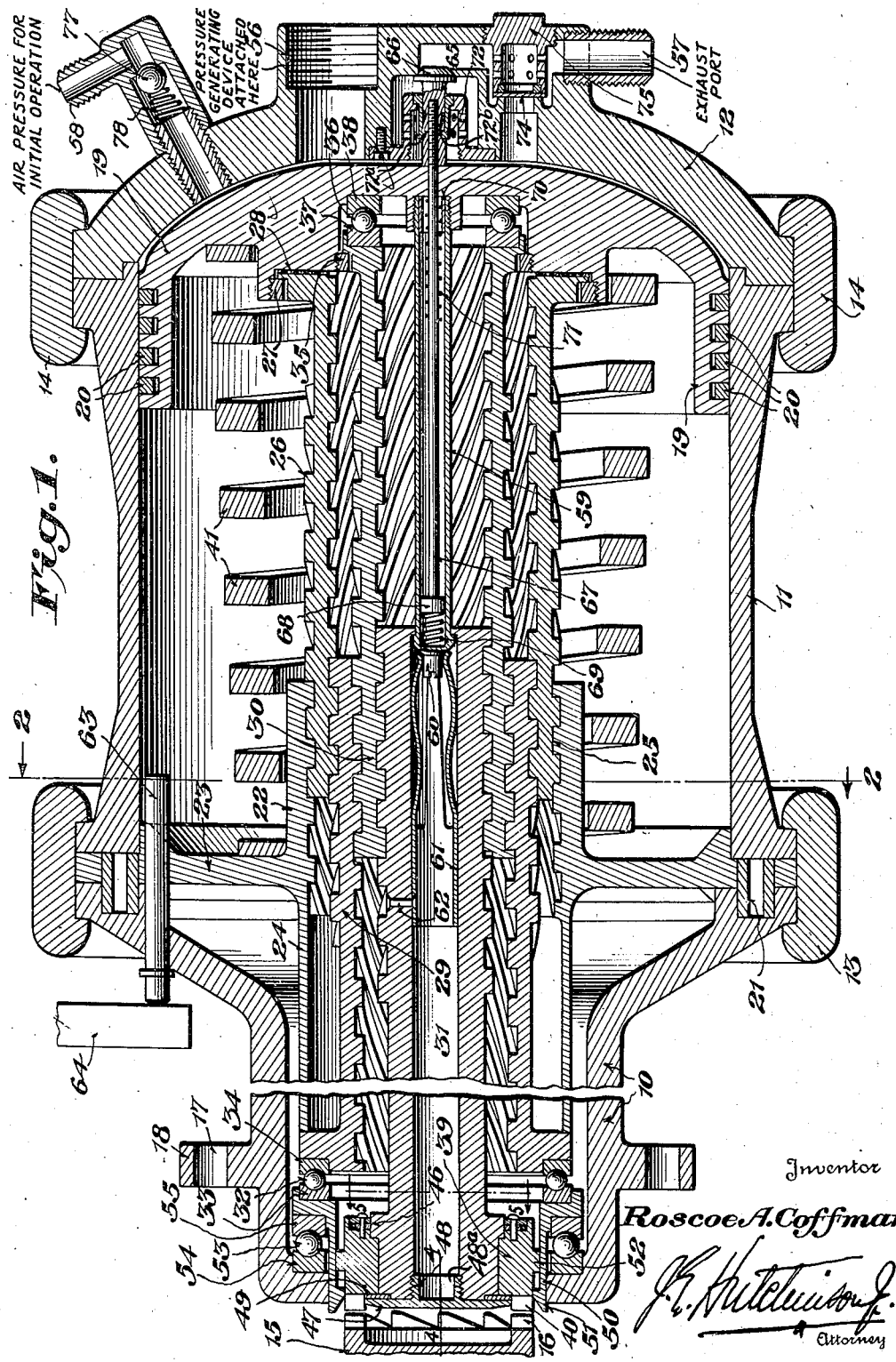
Fig. 1 is a sectional view through the central longitudinal plane of the starting motor, comprising an important part of the invention.
Figure 2:
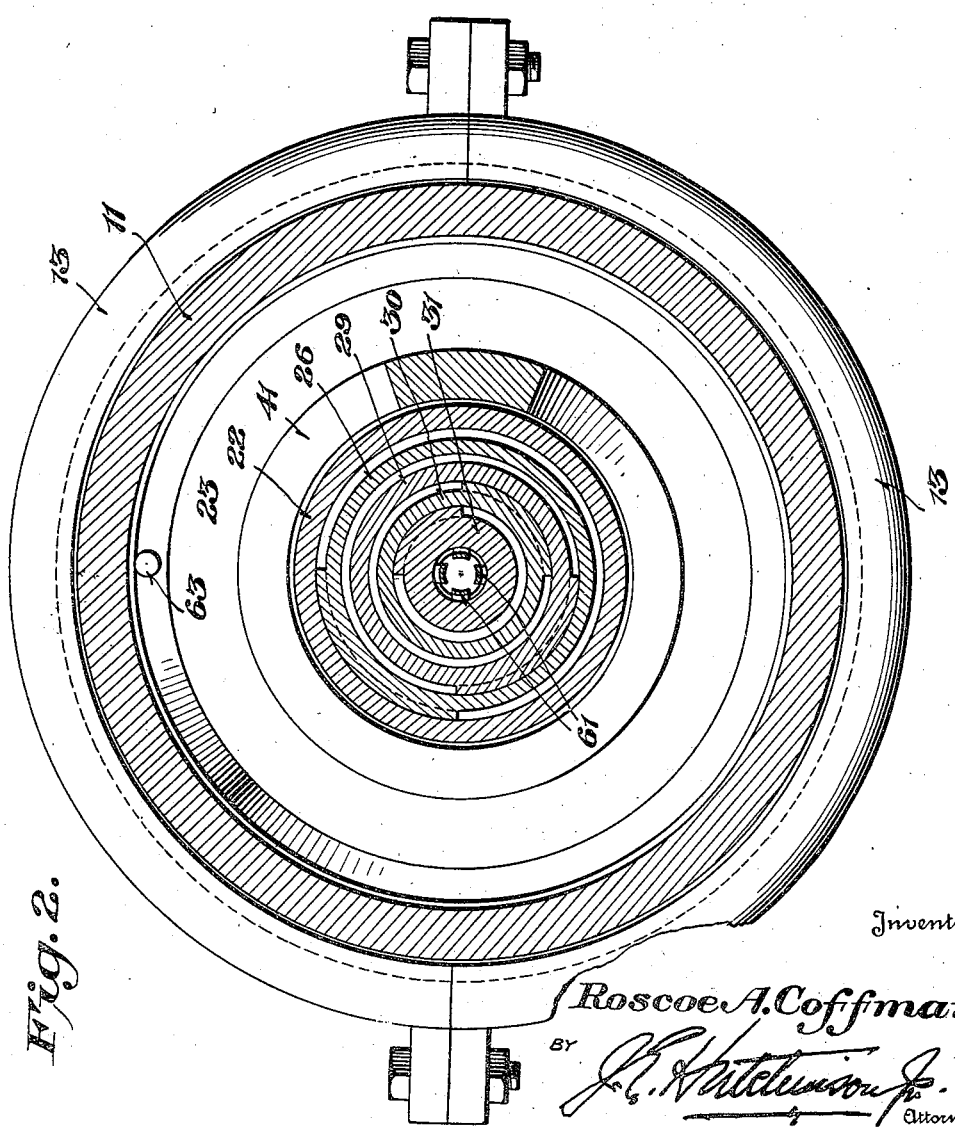
Fig. 2 is a transverse sectional view taken on line 2—2 of Fig. 1.

Fig. 8 is an elevational end view taken from the rear of Fig. 7 and with the parts in power transmitting position, said section being similar to that of Fig. 5 except that the parts in this figure are shown in power transmitting position; and Fig. 9 is a sectional detail view through a portion of a modified starting motor in which means is provided for engaging the motor and engine clutch teeth prior to a power operation.

In the drawings 10, 11 and 12 indicate the front, intermediate and rear sections, comprising a motor casing which may be joined into a unit by means of split draw rings 13 and 14 which are channeled to fit over shoulders on abutting surfaces of the casing sections and which are drawn tightly into locking engagement by means of suitable bolts in a well-known manner. The casing is adapted to be placed in alignment with an engine shaft 15 having clutch teeth 16 formed on its outer peripheral edge. Apertures 17 are formed in a peripheral flange 18 formed on the front section 10 for conveniently fixing the motor in operative position by means of bolts or other suitable fasteners.

Within the motor casing which forms a cylinder is a piston 19 sealed against the cylindrical wall of the intermediate casing section 11 by means of suitable packing rings 20. Resting with its peripheral edge between the front and intermediate motor casing sections 10 and 11 and held against rotation therebetween by means of dowel pins 21, is a worm element 22 which comprises a plate 23 extending transversely across the front end of the motor casing and a tubular element 24 which is concentric with the longitudinal axis of the motor and which has formed on its interior, screw threads 25. An externally and internally threaded driving member 26 is rotatively associated with the piston 19. The driving member 26 is rotatively secured to the piston 19 by means of a locking ring 27. A fiber gasket 28 lies between the abutting plane surfaces of the driving member 26 and the piston 19 for the purpose of cushioning and absorbing the friction caused by relative rotation between the surfaces.

Within the external driving member 26 and formed with external threads adapted to engage with the internal threads on the driving member 26, is an operating member 29. The operating member 29 has internal threads which are adapted to engage external threads on an internal driving member 30. The internal driving member 30 likewise has internal screw threads adapted to engage external threads on the crank shaft 31. The member 29 is mounted for free rotation against ball bearings 32 which are positioned between race rings 33 and 34 at the front end of the motor.

The internal driving member 30 is operatively connected with the piston 19 by means of the locking ring 35 which maintains the internal driving member 30 in rotative contact with the ball bearings 36 between the race rings 37 and 38. To the end of the crank shaft 31 is connected, in driving relation, a clutch collar 39 which is provided with teeth 40 on its outer peripheral edge and which teeth are adapted to engage the clutch teeth 16 on the engine crank shaft 15. The specific construction of the driving connection between the crank shaft 31 and the clutch collar 39 will be more fully described hereinafter.

The piston 19 is normally retained at the rear of the cylinder by means of a relatively heavy coil spring 41 which rests against the internal surface of the piston 19 at one end, and against the plate 23 of the worm element 22 at its other end. When the piston 19 is moved forward under a power impulse against the tension of the coil spring 41, the driving member 26 and the internal driving member 30 are moved forward simultaneously and to the same degree. Since the worm element 22 is fixed against rotation and since the driving member 26 and the internal driving member 30 are associated with the piston 19 for relative rotation with respect thereto, it is evident that the driving member 26 and the internal driving member 30 will rotate by virtue of the engagement between their respective threads and through them and the external threads on the driving member 26 with the internal threads on the worm element 22. It consequently follows that since the external threads on the crank shaft 31 are in engagement with the internal threads on the internal driving member 30, the crank shaft 31 will be rotated anti-clockwise when considering for instance Figs. 1, 3 and 7 of the drawings.

The pitch of the threads on the various relatively movable threaded members and the number of these members will determine the number of revolutions imparted to the crank shaft 31 for each operating stroke of the piston 19. In the present instant the threads on the various threaded members are so related that in its forward movement the driving member 26 is given one-half revolution while the operating member 29 is given one complete revolution. The internal drive member 30 will receive one and one-half revolutions, while two complete revolutions will be imparted to the crank shaft 31. The number of turns imparted to the crank shaft 31, or any of the other threaded parts, may be varied in accordance with the pitch of the threads on their respective surfaces. It is to be understood that the number of inter-threaded driving members may be multiplied to gain greater power and a higher number of per stroke revolutions of the crank shaft.

The crank shaft 31, Figs. 3 to 8 inclusive, has formed at its front end a plurality of longitudinal splines 42 which are adapted to register with spline ways 43 formed in the clutch collar 39. The spline ways 43 are substantially twice as wide as the splines for the purpose of providing a lost motion connection between the clutch collar 39 and the crank shaft 31. The clutch collar 39 is normally urged in a counter-clockwise direction (as shown in Fig. 5) with respect to the crank shaft 31 by means of spring members 44 which are bent around pins 45 extending from the rear surface of the clutch collar 39. One end of the springs 44 bears against the splines 42 of the crank shaft 31, while the other end of the springs 44 are held under tension by contact with a shoulder on the periphery of the clutch collar 39. This arrangement is provided to insure the proper engagement between the engine shaft clutch teeth 16 and motor shaft clutch teeth 40. Should the clutching collar 39 be affixed to the crank shaft 31 rigidly without provision for engaging the teeth before the application of power, it is possible that the teeth might engage imperfectly as shown in Fig. 4. Under such conditions and under the influence of the tremendous power generated by the starter motor, the teeth on either or both of the clutching elements might be seriously injured. By means of the lost motion connection between the clutch collar 39 and the crank shaft 31, it is possible to engage the clutch teeth 16 and 40, perfectly, as shown in Fig. 6 of the drawings. Should an imperfect engagement between these teeth initially be effected, as shown in Fig. 4 (creating momentarily a slight binding effect between said teeth) continued rotary and longitudinal movement of the crank shaft 31 will be permitted irrespective of the clutch collar 39, and this due to the lost motion connection between the clutch collar 39 and the crank shaft 31, thus placing the spring members 44 under tension and permitting the floating clutch collar 39 to adapt or adjust itself to the member to be turned (engine shaft clutch teeth). In other words, clutch collar 39 is not only moved forward in a longitudinal or axial direction due to its connection with the crank shaft 31, but is capable of having a slight rotative movement independently of the rotative movement of the crank shaft, and this rotative or adjusting movement is effective before the splines 42 come into direct driving engagement with the clutch collar 39, thus serving to center accurately and engage the clutch teeth as shown in Fig. 6 to insure a firm and positive turning action of the shaft 15 without any danger of injury to the teeth on either shaft.

The clutch collar 39 is held between an abutting shoulder 46 on the crank shaft 31 and a locking disc 47, which is screwed into the crank shaft 31 by means of screw threads 48, formed on its external rearwardly extending boss 48a. Between the locking disc 47 and the clutch collar 39 is a washer 49 which is adapted to seal the clutch collar 39 against leakage of lubrication through the spline ways formed therein. The forward movement of the clutch collar is limited by means of a bearing member 50 at the front end of which is formed a lip 51 to engage with a peripheral bead 52 formed on the clutch collar 39. The whole assembly, as described, is mounted to rotate against ball bearings 53 which are retained between race rings 54 and 55.

Provided in the rear end or head of the motor is an inlet aperture 56 and an exhaust aperture 57. Formed in the head of the motor is a third aperture 58 through which compressed air may be admitted for a purpose hereinafter more particularly described. The inlet 56 may be connected with any one of the sources of fluid pressure which will be hereinafter described. Assuming that fluid pressure is admitted to the inlet 56, the piston 19 will be driven forward against the tension of the coil spring 41 and the threaded members 26, 29, 30, and 31 will be rotated as described. Attached to the piston 19 by means of screw threads is a sleeve 59 which has formed thereon at its forward end a tapered head 60 which engages the in-bent fingers of a spring sleeve 61, which is attached inside of the hollow crank shaft 31 by means of rivets 62. When the piston 19 moves the sleeve 59 forward, its engagement with the spring sleeve 61 serves to move the crank shaft 31 forward so that the teeth 40 on the clutch collar 39 come into engagement with the teeth 16 on the engine shaft 15. Thus a rotation of the engine shaft 15 is effected.

Since this starting motor is particularly adapted for use with Diesel engines, and since the exhaust valves on Diesel engines are usually held in open position until sufficient momentum has been created to turn the engine rapidly, I have provided an operating bolt 63 which extends from the exterior of the motor casing to a point within the cylinder of the intermediate section 11 which is reached by the piston 19 at the approximate end of its power stroke. The operating rod 63 may contact with some mechanism generally indicated at 64, which is adapted to close the valves on the Diesel engine when the piston 19 of the starting motor has moved the rod 63 into operating contact with the mechanism 64. Suitable intervening mechanism for effecting the operation of the engine valves may be readily provided by those skilled in the art.

Communicating with the exhaust outlet 57 is an exhaust chamber 65 which communicates with the interior of the motor cylinder. This chamber is normally closed by means of a valve 66 on the end of a valve operating rod 67 which extends through the piston 19 and which lies concentrically within the sleeve 59. Formed on the inner end of the rod 67 is a head 68 between which and the end of the sleeve 59 lies a coil spring 69 which is adapted to maintain the valve head 66 against its seat. Within the sleeve 59 and surrounding the rod 67 is a hammer sleeve 70. Within the hammer sleeve 70 and about the rod 67 is a second coil spring 71 which is adapted to effect the opening of the exhaust valve by moving the head 66 from its seat. The opening of the exhaust valve is effected when the piston 19 moves forward in the cylinder and when the same has reached the end of its power stroke. During the forward movement of the piston the coil spring 71 is compressed between the inner surface of the piston and the head 68 on the stem 67. This pressure is, however, insufficient to release the valve head 66 from its seat and the positive movement of the valve is not effected until the hammer sleeve 70 contacts the head 68 on the rod 67. After the rod 67 has been moved positively in this manner to disengage the notch 72a on the rear end of the valve stem from the spring member 72, the accumulated power of the tensioned coil spring 71 will serve to move the valve head 66 away from its seat with a snap-action to ensure a complete opening. In its open position the valve is held positively by engagement of the spring fingers 72 within the second notch 72b on the rear of the valve stem. The valve closes when the piston 19 is returned to its position of rest by the spring 41 and when the coil spring 69 is compressed between the valve stem head 68 and the front end of the casing 59.

Communicating directly with the interior of the cylinder and the exhaust port 57 is a passage which is separated from the exhaust port 57 by means of a frangible disc 74. The disc 74 may be removed and replaced by removing the plug 75 and the same is held in position by the plug 75 which passes through the exhaust chamber 65, but about and through which gases may flow freely from the chamber 65, into the exhaust 57 during the normal exhausting operation. Should for any reason a dangerous condition of pressure be created within the cylinder, the frangible disc or diaphragm 74 is adapted to rupture before serious damage can be done by such abnormal condition.

The inlet 58 may be connected to a source of air pressure. The inlet is controlled by a ball valve 77 which is spring pressed to its seat by means of a spring 78. Air pressure of 100 to 125 pounds is commonly found where Diesel engines are used, and this pressure, when applied to the starting motor, serves as a cushioning pressure for permitting effective and easy coupling up of the engine and starter shafts and maintaining a smooth connection between the starter and the engine by occupying the open spaces in the breech mechanism, in the burning chamber, and in the space between the piston 19 and the cylinder head 12. By the use of air pressure the clutch teeth may be inter-engaged by an initial forward movement of the piston 19 prior to the initiation of its full power stroke. Such air supply likewise will assist the combustion of fuel and may be utilized, after a power operation of the piston 19, to cool the cylinder, and the combustion chamber. This is particularly advantageous when the motor must be utilized successively and at short intervals, for other cooling means may not be available.

It may be desirable to dispense with the lost motion connection between the clutch collar 39 and the crank shaft 31, and for the purpose of permitting the clutch teeth to be formed integrally with the end of the crank shaft 31 or for permitting a clutch collar to be fixed to the crank shaft, the modified clutch engaging mechanism illustrated in Fig. 9 has been provided. This mechanism permits the use of a rigid clutching device on the end of the crank shaft and still insures proper connection between the clutch teeth because of the fact that the clutch teeth carried by the end of the crank shaft 31 are moved into engagement with the clutch teeth on the engine shaft prior to the application of operating pressure to the piston 19. This mechanism will now be described.

A housing 154 has been provided with screw threads adapted to engage threads on a relatively large bore in the back of the motor head 12. A gasket 155 may be provided between a shoulder on the housing 154 and the body of the motor head 12 for the purpose of sealing the joint against pressure leakage. In the housing is provided an aperture 156 into which may be threaded any one of the breech and combustion mechanisms hereinabove described. In lieu of the attachment which may be made at 156 the pressure generating mechanism may be attached at 157 in the motor head 12 and the inlet 156 may be sealed with a plug. In the event the pressure mechanism is attached at 157, which communicates directly with the interior of the cylinder, the inlet 158 is brought in communication with a source of air pressure for effecting the initial operation of a piston 159 within the housing 154. The piston 159 is faced on its rear with a layer of asbestos insulating material 160 which is covered with a thin spinning plate 161 for the purpose of protecting the piston 159 against excessive heat which might have a detrimental effect on the elasticity of the springs associated with the piston 159. Surrounding the piston 159 and threaded into the front end of the housing 154 is a shell 162 between which and the piston 159 is a coil spring 163 which normally serves to retain the piston 159 in its position at the rear of the housing 154. The front end of the piston 159 is adapted to slide in a reduced bearing surface formed on the front end of the shell 162. Around the front end of the shell 162 and in that portion which forms a right angle to its main body are a plurality of passages 164 for a purpose which will hereinafter become evident. The piston 159 is inwardly beveled along its front edge at 165, which beveled surface lies in contact with pins 166 which are slidably mounted in a sleeve 167, which at its forward end is screw threaded into the piston 19, and which compresses a gasket 168 between a shoulder formed thereon and the piston 19 for sealing the two in gas tight relation. Splined to the sleeve 167 and lying concentrically therein is a second sleeve 169 which is adapted to move longitudinally relative to the sleeve 167, but which is normally locked thereto by means of locking pins 170 which pass therethrough and into apertures in the sleeve 167, which apertures lie directly over the pins 166 carried by the sleeve 167. The locking pins 170 are normally pressed and retained in locking position by spring fingers 171 which are fixed to the sleeve 169 by rivets 172. From the description as thus far given it is evident that when the piston 159 moves forward relative to the sleeve 167, and its forward beveled surface 165 contacts the pins 166, these pins are pressed inwardly, consequently the locking pins 170 are pressed inwardly against the tension of the spring fingers 171. As soon as the locking pins 170 have been pressed inwardly sufficiently far to lie outside the plane of the sleeve 167, the internal sleeve 169 will be free to move forward longitudinally with respect to the external sleeve 167.

The external sleeve 167 is formed at its forward end with an enlarged bore and the internal sleeve 169 is formed with a shoulder 173 which is adapted to lie in contact with the flange formed between the enlarged bore and the smaller bore of the sleeve 167. Between the shoulder 173 and a sleeve member 174, carried at the forward end of the sleeve 167, is a coil spring 175. Within the coil spring 175 is a second coil spring 176 which contacts the front end of the internal sleeve 169 and the element 177 to which the crank shaft operating tube 59 is attached.

Within the piston 159 is a central bore through which the extension 67' of the valve 67 passes. This bore is closed by a screw threaded plug 178 which supports one end of a coil spring 179, which is of greater strength than the combined strength of coil springs 175 and 176. The extension 67' of the valve stem 67 likewise passes through a plug 180 which supports the opposite end of the coil spring 179 and which is slidably mounted within the central bore of the piston 159 and with relation to which the valve stem 67 may slide. The valve stem is screw threaded to the valve stem extension 67', and the extension is threaded to the internal sleeve 169 by means of threads at 181 on the extension of the valve stem. It is therefore evident that the piston 159 may move longitudinally with respect to the valve stem 67 and its attendant mechanism, and that the internal sleeve 169, which is attached to the valve stem extension 67', may move longitudinally with respect to the external sleeve 167 when the locking pins 170 are released. Furthermore it will be noted that the valve stem 67 will move longitudinally with respect to the casing 59 and that the casing 59 may move longitudinally with respect to the piston 19.

When air pressure is admitted through the inlet 158 the piston 159 moves forward against the tension of the spring 163. During this movement the beveled surface 165 on the end of the piston 159 moves the pins 166 inwardly against the locking pins 170 to move the locking pins 170 out of the plane of the external sleeve 167. When during the movement of the piston 159 the plug 180 carried thereby comes in contact with the end of the internal sleeve 169, the internal sleeve is moved forward with respect to the external sleeve 167 against the tension of the springs 175 and 176. When the spring 176 is placed under sufficient tension the element 177 which carries the tube 59 is moved forward so that its head (see Fig. 1) is brought to bear against the fingers of the spring sleeve 61 which is riveted to the crank shaft 31. This serves to move the crank shaft forward to engage the teeth thereon with the teeth on the engine shaft. If this engagement is effected before the termination of the forward movement of the piston 159, the head on the tube 59 slips past the spring fingers into the enlarged portion of the spring sleeve 61 to avoid further forward pressure against clutch teeth which are now in driving relation.

If the teeth are not in perfect alignment the coil springs 175 and 176 will absorb further forward movement until such time that the crank shaft 31 begins to rotate under the initial impulse from the piston 19, and then the added forward pressure will serve to center the teeth accurately.

The sliding joint between the members 174 and 177 is packed by means of a leather gasket 182, and the valve stem 67 is surrounded by a leather gasket 183 which serve to seal the joint against pressure leakage.

The forward movement of the piston 159 under the impulse of air pressure is limited by the opening 184 between the internal body portion of the casing 154 and the rear end of the shell 162. When the piston 159 moves beyond this opening the air pressure will flow past the piston and through the openings 164 into contact with the rear face of the piston 19, thus moving the piston forward to a slight degree, rotating the crank shaft 31 to insure proper connection between the clutch teeth before heavy pressure is admitted from the pressure generating device connected at 157.

The exhaust valve 166' in this form of the invention is similar to that and operates like that shown in Fig. 1 of the drawings, and the operation thereof need not be repeated. It will suffice to say that during the exhaust movement of the piston 19 the spent gases pass into the housing 154, through the openings 164, around the shell 162, into the exhaust passage 185, and from there into the passage 186 past the exhaust valve 166 and into the exhaust outlet 57. As soon as the pressure on the piston 159 is relieved the several springs return their associated parts to their normal position.

As hereinbefore indicated, it is possible to connect a pressure generating chamber with the inlet 156, in which event the inlet 157 may be closed by means of a plug. When the pressure generating mechanism is connected with the inlet 156, the initial generation of the pressure serves to operate the clutch teeth engaging mechanism as hereinbefore described, and the continued generation of the pressure will maintain the piston 159 beyond the opening 184 to permit the gases to flow past the piston, around the shell 162, through the openings 164, and directly against the rear of the main piston 19.

It is apparent that the principles taught by this disclosure may be modified and combined in various ways not specifically hereinabove set forth, and it is the object of the invention, therefore, not to limit its practice to any specific form, but since various modifications may be made it is specifically understood that the practice of the invention shall be in no way limited except as limitations may be imposed thereon by the scope of the sub-joined claims.

It is to be definitely understood that in both forms of applicant's invention air pressure of approximately 100 to 125 lbs. may be used to allow the interengaging teeth of the clutch means to come into proper and intermeshing relation, and that thereafter a much higher working pressure fluid is admitted to the starter cylinder for creating the main or normal power stroke of the starter piston for the actual cranking or starting operation, and in this connection, it is to be noted that in Fig. 1 the air pressure is admitted at 58, and in Fig. 9 at 158.

What I claim is:

1. In an engine starter having a piston and a rotary crank shaft operated thereby, a clutch member associated with said crank shaft adapted to engage a member to be turned, and means acting on said clutch member and permitting the same to move into complete engagement with the member to be turned independently of the cranking or power rotative movement of the crank shaft and prior to the application of normal working power to said clutch member.

2. In a starting motor, a piston adapted to be moved by fluid pressure, a rotary crank shaft associated with said piston and adapted to be moved by said piston, clutch teeth carried by said shaft adapted to move into driving relation with teeth on a part to be moved and capable of slight rotative movement independent of said shaft, means for initially moving said piston to project said clutch teeth into driving relation, means thereafter operative to drive said piston through a working stroke, and mechanism operative on said clutch teeth to move the same to inoperative or non-driving position with respect to said crank shaft after the working stroke of said piston.

3. In a starting motor, a piston adapted to be moved by fluid pressure, a rotary crank shaft associated with said piston and adapted to be moved longitudinally by said piston into driving relation for starting purposes, clutch teeth carried by said shaft adapted to move into driving relation with teeth on a part to be moved, a lost motion connection between said shaft and said clutch teeth permitting limited relative rotation therebetween, means normally urging said clutch teeth in the same direction as the direction of rotation of said crank shaft, means for initially projecting said clutch teeth into driving relation, and means thereafter operative to move said piston through a working stroke.

4. In a starting motor, a piston adapted to be moved by fluid pressure, a rotary crank shaft associated with said piston and adapted to be moved by said piston, clutch teeth carried by said shaft adapted to move into driving relation with teeth on a part to be moved, a lost motion connection between said shaft and said clutch teeth permitting limited relative rotation therebetween, means for maintaining said clutch teeth at one limit of their relative rotative movement and urged in a direction similar to the direction of rotation of the crank shaft when said teeth are not in driving relation, means for initially projecting said clutch teeth into driving relation, and means thereafter operative to move said piston through a working stroke.

5. In a starting motor, a piston adapted to be moved by fluid pressure, a rotary crank shaft associated with said piston and adapted to be moved by said piston, clutch teeth carried by said shaft adapted to move into driving relation with teeth on a part to be moved, a lost motion connection between said shaft and said clutch teeth permitting limited relative rotation therebetween, means permitting driving relation between said clutch teeth and the shaft, means for maintaining said clutch teeth at one limit of their relative rotative movement and urged in a direction similar to the direction of rotation of the crank shaft when said teeth are not in driving relation, means for initially projecting said clutch teeth into driving relation, and means thereafter operative to move said piston through a working stroke.

6. In a starting motor, a piston adapted to be moved by fluid pressure, a rotary crank shaft associated with said piston and adapted to be moved by said piston, clutch teeth carried by said shaft adapted to move into driving relation with teeth on a part to be moved, a lost motion connection between said shaft and said clutch teeth permitting limited relative rotation therebetween, means for admitting auxiliary fluid pressure to said motor to move said piston and project said clutch teeth into driving relation, and means for thereafter admitting a different charge of fluid pressure to said motor to move said piston through a working stroke.

7. In a starting motor, a piston adapted to be moved by fluid pressure, a rotary crank shaft associated with said piston and adapted to be moved by said piston, clutch teeth carried by said shaft adapted to move into driving relation with teeth on a part to be moved, a lost motion connection between said shaft and said clutch teeth permitting limited relative rotation therebetween, resilient members interconnecting said shaft and said clutch teeth for maintaining said teeth at one limit of their relative movement and urged in a direction similar to the direction of rotation of the crank shaft when said teeth are not in driving relation, fluid pressure means for initially projecting said clutch teeth into driving relation, and further fluid pressure means thereafter operative to move said piston through a working stroke.

8. In a starting motor, a piston adapted to be moved by fluid pressure, a rotary crank shaft associated with said piston and adapted to be moved by said piston, clutch teeth carried by said shaft adapted to move into driving relation with teeth on a part to be moved, a lost motion connection between said shaft and said clutch teeth permitting limited relative rotation therebetween, spring mechanism normally tending to move said teeth in a direction similar to the direction of rotation of said crank shaft, members interconnecting said shaft and said clutch teeth at one limit of their relative rotative movement when said teeth are in driving relation with respect to said shaft, auxiliary fluid pressure means for initially projecting said clutch teeth into driving relation, and further fluid pressure means thereafter operative to move said piston through a working stroke, said spring mechanism acting on said clutch teeth to move them to an inoperative position at the other limit of their relative rotative movement after a working stroke of said piston.

9. In a starting motor, a piston, a rotary crank shaft associated with said piston and adapted to be moved by said piston, a clutch member carried by said shaft adapted to be moved into driving relation with a part to be driven, clutch operating means carried by said piston, a second piston operative on said clutch operating means to move said clutch into driving relation, and means for admitting fluid pressure to each of said pistons.

10. In a starting motor, a piston, a rotary crank shaft associated with said piston and adapted to be moved by said piston, a clutch member carried by said shaft adapted to be moved into driving relation with a part to be driven, clutch operating means carried by said piston, a second piston operative on said clutch operating means to move said clutch into driving relation, means for admitting fluid pressure to each of said pistons, and means limiting the movement of said second piston.

11. In a starting motor, a piston, a rotary crank shaft associated with said piston and adapted to be rotated by said piston, a clutch member carried by said shaft adapted to be moved into driving relation with a part to be driven, clutch operating means carried by said piston, a second piston operative on said clutch operating means to move said clutch into driving relation, means for admitting fluid pressure to said last named piston to project said clutch member, and independent means for admitting fluid pressure to said first named piston to move the same through a working stroke.

12. In a starting motor, a piston, a rotary crank shaft associated with said piston and adapted to be rotated by said piston, a clutch member carried by said shaft adapted to be moved into driving relation with a part to be driven, clutch operating means carried by said piston, an auxiliary cylinder in said motor, a second piston within said cylinder operative on said clutch operating means to move said clutch into driving relation, means for admitting fluid pressure to said last named piston to project said clutch member into driving relation, vents in said cylinder to limit the movement of said second named piston, and independent means for admitting fluid pressure to said first named piston to move the same through a working stroke.

13. In a starting motor, a piston, a rotary crank shaft associated with said piston and adapted to be rotated by said piston, a clutch member carried by said shaft adapted to be moved into driving relation with a part to be driven, clutch operating means carried by said piston, an auxiliary cylinder in said motor, a second piston within said cylinder operative on said clutch operating means to move said clutch into driving relation, means for admitting fluid pressure to said last named piston to project said clutch member into driving relation, vents in said cylinder to limit the movement of said second named piston, and a passage between said vents and said first named piston whereby said second named piston is first moved and thereafter pressure is applied to said first named piston to drive the same through a working stroke.

14. In a starting motor, a cylinder, a piston mounted for rectilinear movement in said cylinder, a crank shaft located along the longitudinal axis of said cylinder, means interconnecting said piston and said shaft whereby movement of said piston effects rotation of said shaft, a clutch member carried at one end of said shaft adapted to be moved into driving relation with a part to be driven, clutch operating means extending longitudinally through said shaft, a second piston operative on said clutch operating means to move said clutch into driving relation, means for admitting fluid pressure to each of said pistons to effect their movement.

15. In a starting motor, a cylinder, a piston mounted for rectilinear movement in said cylinder, a crank shaft located along the longitudinal axis of said cylinder, means interconnecting said piston and said shaft whereby movement of said piston effects rotation of said shaft, a clutch member carried at one end of said shaft adapted to be moved into driving relation with a part to be driven, clutch projecting means extending longitudinally through said shaft and piston, a second cylinder axially associated with said first named cylinder, a second piston within said second cylinder operative on said clutch operating means to move said clutch member into driving relation, means for admitting fluid pressure to said second piston to project said clutch member, and independent means for admitting fluid pressure to said first named piston to move the same through a working stroke.

16. In a starting motor, a cylinder, a piston mounted for rectilinear movement in said cylinder, a crank shaft located along the longitudinal axis of said cylinder, means interconnecting said piston and said shaft whereby movement of said piston effects rotation of said shaft, a clutch member carried at one end of said shaft adapted to be moved into driving relation with a part to be driven, clutch projecting means extending longitudinally through said shaft and piston, a second cylinder axially associated with said first named cylinder, a second piston within said second cylinder operative on said clutch operating means to move said clutch member into driving relation, means for admitting fluid pressure to said second piston to project said clutch member, vents in said second cylinder to limit the movement of the piston therein, and independent means for admitting fluid pressure to said first named piston to move the same through a working stroke.

17. In a starting motor, a cylinder, a piston mounted for rectilinear movement in said cylinder, a crank shaft located along the longitudinal axis of said cylinder, means interconnecting said piston and said shaft whereby movement of said piston effects rotation of said shaft, a clutch member carried at one end of said shaft adapted to be moved into driving relation with a part to be driven, clutch projecting means extending longitudinally through said shaft and piston, a second cylinder axially associated with said first named cylinder, a second piston within said second cylinder operative on said clutch operating means to move said clutch member into driving relation, means for admitting fluid pressure to said second piston to project said clutch member, vents in said second cylinder to limit the movement of the piston therein, and a passage between said vents and said first named piston whereby said second named piston is first moved and thereafter pressure is applied to said first named piston to drive the same through a working stroke.

18. In an engine starter having a piston and a rotary crank shaft operated thereby, a clutch member associated with said crank shaft adapted to engage a member to be turned, and means permitting said clutch member to adjust itself to the crank shaft and the member to be turned and according to varying conditions for insuring complete engagement of the clutch member with the member to be turned and prior to the application of normal working power to said clutch member, said means normally tending to urge the clutch member in the same direction as the direction of rotation of said crank shaft.

19. In an engine starter having a piston and a rotary crank shaft operated thereby, a clutch member associated with said crank shaft adapted to engage a member to be turned, and means permitting said clutch member to initially move in a rotative direction independently of the rotative movement of the crank shaft and adjust itself to the member to be turned and according to varying conditions for insuring complete engagement of the clutch member with the member to be turned and prior to the application of normal working power to said clutch member, said clutch member being normally urged in a direction similar to the direction of rotation of said crank shaft.

20. In an engine starter having a longitudinally moving telescoping piston and a rotary crank shaft operated thereby, a clutch member initially movable in the same longitudinal direction as said piston associated with said crank shaft and adapted to engage a member to be turned, and means acting on said clutch member through longitudinal splines to insure said initial movement and complete driving engagement of said clutch member with the member to be turned prior to the application of normal working power to said clutch member, said means tending normally to urge the clutch member in a direction similar to the direction of rotation of the crank shaft.

ROSCOE ALEXANDER COFFMAN.